United States Patent
Yamamoto et al.

(10) Patent No.: US 10,062,196 B2
(45) Date of Patent: Aug. 28, 2018

(54) INFORMATION PROCESSING APPARATUS, INFORMATION PROCESSING METHOD, AND RECORDING MEDIUM, FOR SUPERIMPOSING ADDITIONAL OBJECT ON IMAGE OBJECT, BASED ON SPECIFIED ATTRIBUTE

(71) Applicants: Hiroki Yamamoto, Tokyo (JP); Fumiko Tsuwano, Tokyo (JP)

(72) Inventors: Hiroki Yamamoto, Tokyo (JP); Fumiko Tsuwano, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/254,003

(22) Filed: Sep. 1, 2016

(65) Prior Publication Data

US 2017/0076478 A1    Mar. 16, 2017

(30) Foreign Application Priority Data

Sep. 14, 2015  (JP) ................................. 2015-180404

(51) Int. Cl.
*G06T 11/60* (2006.01)
*H04N 1/54* (2006.01)
*G06K 9/46* (2006.01)

(52) U.S. Cl.
CPC ........... *G06T 11/60* (2013.01); *G06K 9/4652* (2013.01); *G06K 9/4671* (2013.01); *H04N 1/54* (2013.01)

(58) Field of Classification Search
None
See application file for complete search history.

(56) References Cited

U.S. PATENT DOCUMENTS

| | | | |
|---|---|---|---|
| 9,111,205 B2 | 8/2015 | Tsuwano et al. | |
| 2013/0057881 A1 | 3/2013 | Nishide | |
| 2013/0271791 A1 | 10/2013 | Miyazaki et al. | |
| 2014/0225928 A1* | 8/2014 | Konnola | G06F 17/30899 345/636 |
| 2015/0131113 A1 | 5/2015 | Tsuwano et al. | |
| 2015/0172510 A1 | 6/2015 | Davidson | |

FOREIGN PATENT DOCUMENTS

| | | |
|---|---|---|
| EP | 2650775 A1 | 10/2013 |
| JP | 2012-058977 | 3/2012 |
| JP | 2015-095123 | 5/2015 |
| WO | WO2013/179276 A1 | 12/2013 |

OTHER PUBLICATIONS

Adobe, "Acrobat Help | Color conversion and ink management (Acrobat Pro)", Mar. 28, 2014, https://web.archive.org/web/20141011140509/https://helpx.adobe.com/indesign/using/prprepari-pdfs-service-providers.html.*
European search report dated Feb. 7, 2017 in corresponding. European Patent Application No. 16186300.6.

* cited by examiner

*Primary Examiner* — Nicholas R Wilson
(74) *Attorney, Agent, or Firm* — Cooper & Dunham LLP (57) ABSTRACT

An information processing apparatus includes processing circuitry configured to specify, with respect to image data including a plurality of image objects each having an attribute. The processing circuitry is further configured to identify all image objects having the specified attribute from among the plurality of image objects, and to create, for each of the identified image objects with the same attribute, an additional object that has an identical shape to the image object and that is to be superimposed on the image object.

10 Claims, 10 Drawing Sheets

| FIRST LEVEL | SECOND LEVEL | THIRD LEVEL | DESCRIPTION |
|---|---|---|---|
| root | | | NO ATTRIBUTE (TAG EXPRESSING ROOT) |
| | settingName | | SETTING NAME TAG |
| | | targetObjType | SPECIFIED OBJECT TYPE TAG |
| | | Special color | SPECIAL COLOR TAG |
| | | tintValue | DENSITY TAG |
| | | targetPages | TARGET-PAGES TAG |

INFORMATION PROCESSING APPARATUS, INFORMATION PROCESSING METHOD, AND RECORDING MEDIUM, FOR SUPERIMPOSING ADDITIONAL OBJECT ON IMAGE OBJECT, BASED ON SPECIFIED ATTRIBUTE

CROSS-REFERENCE TO RELATED APPLICATION

The present application claims priority under 35 U.S.C. § 119 to Japanese Patent Application No. 2015-180404, filed Sep. 14, 2015. The contents of which are incorporated herein by reference in their entirety.

BACKGROUND OF THE INVENTION

1. Field of the Invention

The present invention relates to an information processing apparatus, an information processing method, and a recording medium.

2. Description of the Related Art

In recent years, techniques of printing with a special ink, such as clear toner, are increasing. In printing with a special ink, an image object to be printed with the special ink (hereinafter, special color object) is placed over an existing image object of an original. Thus, printing with a special ink is enabled.

For example, in Japanese Unexamined Patent Application Publication No. 2015-95123, a technique of placing, right on an existing image object that is present at a position specified by a user, an image object that is in the identical shape thereto is disclosed.

However, with the configuration disclosed in Japanese Unexamined Patent Application Publication No. 2015-95123, when more than one image object to be a subject of processing (an image object on which an additional object expressing an additional image object is placed) is included in image data of an original, position specifying work is necessary to be performed as many time as the number of subject image objects. Therefore, the work efficiency at the time of creating an additional object is lowered.

SUMMARY OF THE INVENTION

According to one aspect of the present invention, an information processing apparatus includes an attribute specifying unit, a first identifying unit, and a creating unit. The attribute specifying unit is configured to specify an attribute of an image object that is a subject on which an additional object indicating an additional image object is superimposed. The first identifying unit is configured to identify all image objects having the attribute specified by the attribute specifying unit from among a plurality of image objects included in image data. The creating unit is configured to create, for each of the image objects identified by the first identifying unit, the additional object that has an identical shape to the image object and that is to be superimposed on the image object.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image processing apparatus, an image processing method, and a recording medium that enable to improve the work efficiency at the time of creating an additional object.

Embodiments of an image processing apparatus, an image processing method, and a program according to the present invention are explained in detail below with reference to the accompanying drawings.

Figure 1:
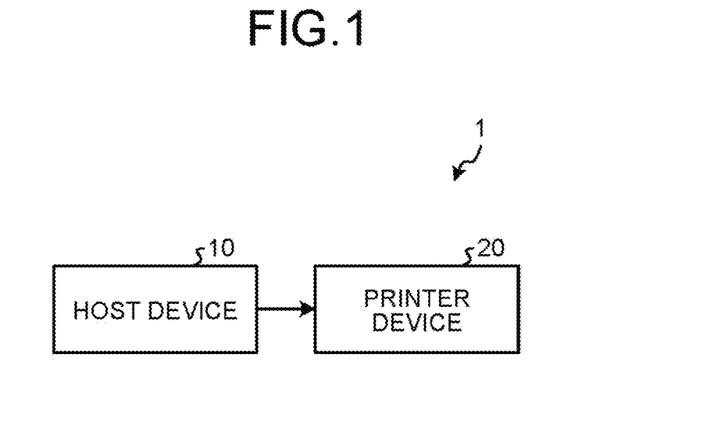
FIG. 1 illustrates one example of a configuration of an image processing system.

FIG. 1 illustrates one example of a configuration of an information processing system 1 of an embodiment. As illustrated in FIG. 1, the information processing system 1 includes a host device 10 and a printer device 20. The host device 10 and the printer device 20 are connected to each other through a wired or wireless communication line such that data can be communicated with each other.

The host device 10 transmits image data to the printer device 20. The host device 10 can transmit image data constituted only of colored plate data to the printer device 20, or can transmit image data of colored plate data and glass-control plate data combined to the printer device 20.

The colored plate data is image data that defines an image to be formed with colored developer such as a color toner. Specifically, the colored plate data is image data defining a color density value of RGB, CMYK, or the like for each drawing region.

The gloss-control plate data is one example of image data (special-color plate data) to be printed with a special ink, and is image data that defines a gloss effect to be added to paper. The gloss-control plate data is, specifically, image data that specifies a region to which a gloss effect is given and a type of the gloss effect, to control adhesion of a clear toner according to the gloss effect, which is visual and tactile effects to be given to paper. The gloss-control plate data expresses a density value of a gloss region (drawing region) indicating a region to which a clear toner is applied with a density value of, for example, 0% to 10% (may be expressed by "0" to "255" or the like), similarly to the colored-plate image data of RGB, CMYK, or the like, and is set to a value according to a type of the gloss effect. In this example, for each type of gloss effects, a corresponding range of the density value is determined. The clear toner is a transparent toner (no color) including no color material. Transparent (no color) means that the transmittance thereof is, for example, 70% or higher.

Furthermore, the host device 10 has a function of positioning an image object to be printed with clear toner (hereinafter, "special color object" in some cases) over an existing image object of an original. Although the special color object is one example of an "additional object" indicating an image object (additional image object) to be newly positioned over an existing image object in this example, a mode of the additional image object is not limited to the special color object.

The printer device 20 performs printing based on image data received from the host device 10. In this example, at least respective toners of CMYK and a clear toner are equipped in the printer device 20, and for each toner, an image forming unit including a photoconductor, a charging unit, a developing unit, and a photo conductor cleaner, and an exposure unit, and the like are equipped. The printer device 20 forms a toner image according to each toner on the photoconductor, by irradiating light beams from the exposure unit based on image data received from the host device 10, and transfers the image onto a recording medium such as a recording paper. The transferred toner image is fixed on the recording medium with heat and pressure applied at a temperature within a predetermined range (normal temperature) by a not illustrated fixing unit. Thus, an image is formed on the recording medium. As a method for the above printing various known techniques can be applied.

Figure 2:
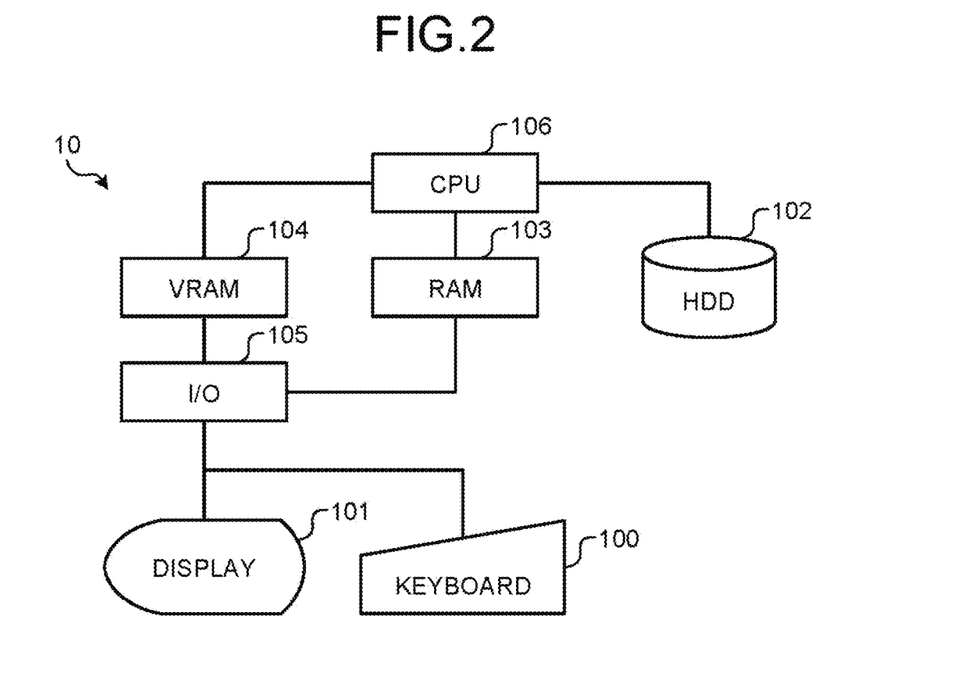
FIG. 2 illustrates one example of a hardware configuration of a host device.

A configuration of the host device 10 that is one example of the information processing apparatus is explained below. FIG. 2 illustrates a hardware configuration example of the host device 10. As illustrated in FIG. 10, the host device 10 includes a keyboard 100, a display 101, a hard disk drive (HDD) 102, a random access memory (RAM), a video random access memory (VRAM) 104, a not illustrated read only memory (ROM), an input/output interface (I/O) 105, and a central processing unit (CPU) 106, and has a hardware configuration having a function serving as a computer.

Figure 3:
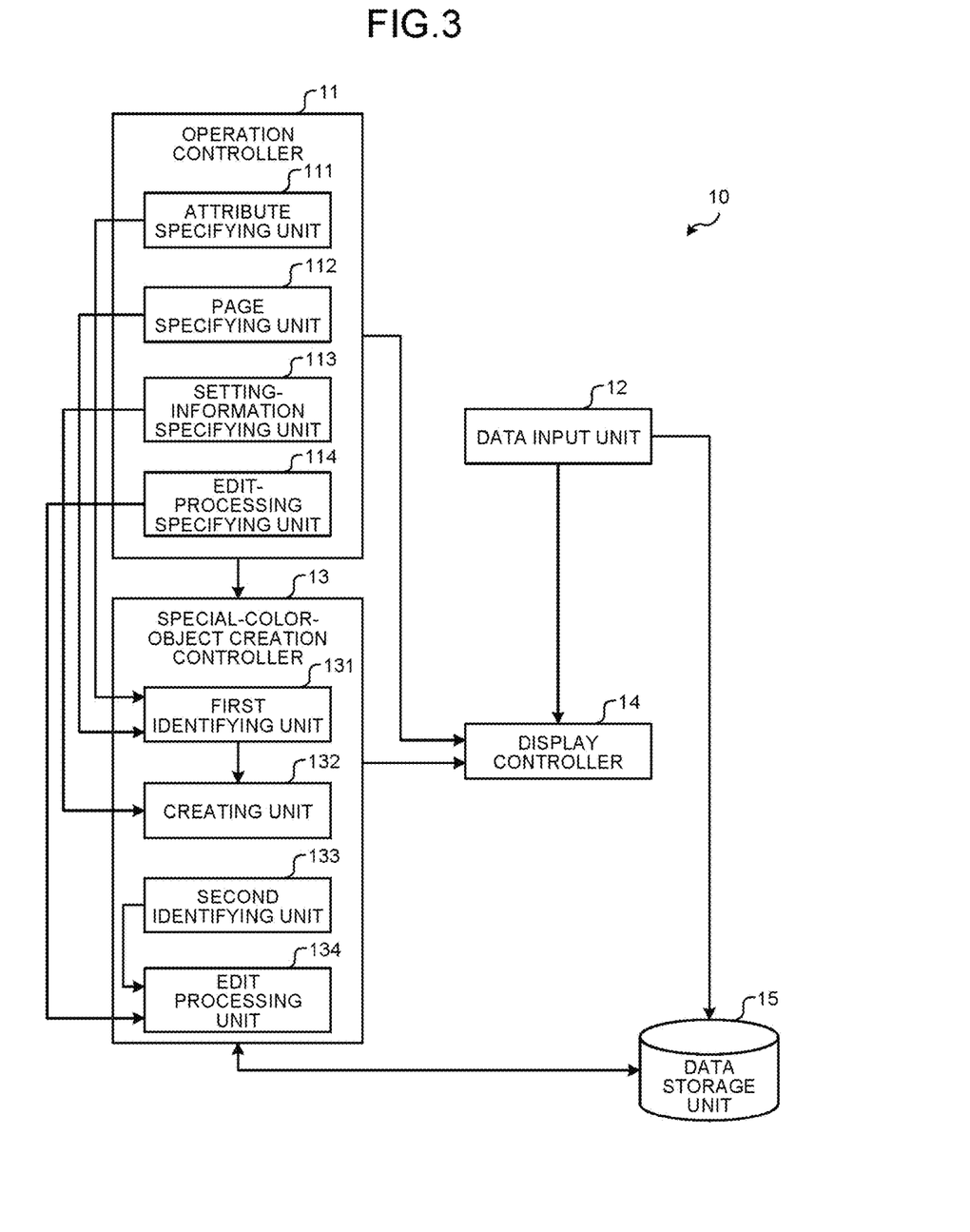
FIG. 3 illustrates one example of a functions of the host device.

FIG. 3 illustrates one example of a function of the host device 10. Although a part relating to a function of creating a special color object as an additional object that indicates an additional image object is mainly illustrated in FIG. 3 for convenience of explanation, functions of the host device 10 is not limited to the function illustrated in FIG. 3. As illustrated in FIG. 3, the host device 10 includes an operation controller 11, a data input unit 12, a special-color-object creation controller 13, a display controller 14, and a data storage unit 15.

The operation controller 11 creates event information according to various operations made using an input device (operation unit), such as the keyboard 100, and sends the created event information to the special-color-object creation controller 13 described later. Information included in the event information is information instructing creation of a special color object, information indicating an attribute specified by an attribute specifying unit 111 described later, information indicating a page specified by a page specifying unit 112 described later, setting information specified by a setting-information specifying unit 113 described later, information indicating edit processing specified by an edit-processing specifying unit 114 described later, and the like. The operation controller 11 is specifically explained below.

As illustrated in FIG. 3, the operation controller 11 includes the attribute specifying unit 111, the page specifying unit 112, the setting-information specifying unit 113, and the edit-processing specifying unit 114.

The attribute specifying unit 11 specifies an attribute of an image object on which a special color object to be newly added (one example of an additional object) is to be superimposed according to an operation by a user. An attributed (type) of an image object includes "text" indicating an attribute of an object expressed by a character string, "graphics" indicating an attribute of an object expressed by vector data, and "image" indicating an attribute of an object expressed by binary data. The page specifying unit 112 specifies at least one page to be a subject of special-color object creation out of image data of an original (hereinafter, "original data") according to an operation by a user. In this example, the original data is a set of pages, and is data, for example, in a portable document format (PDF).

Figure 4:
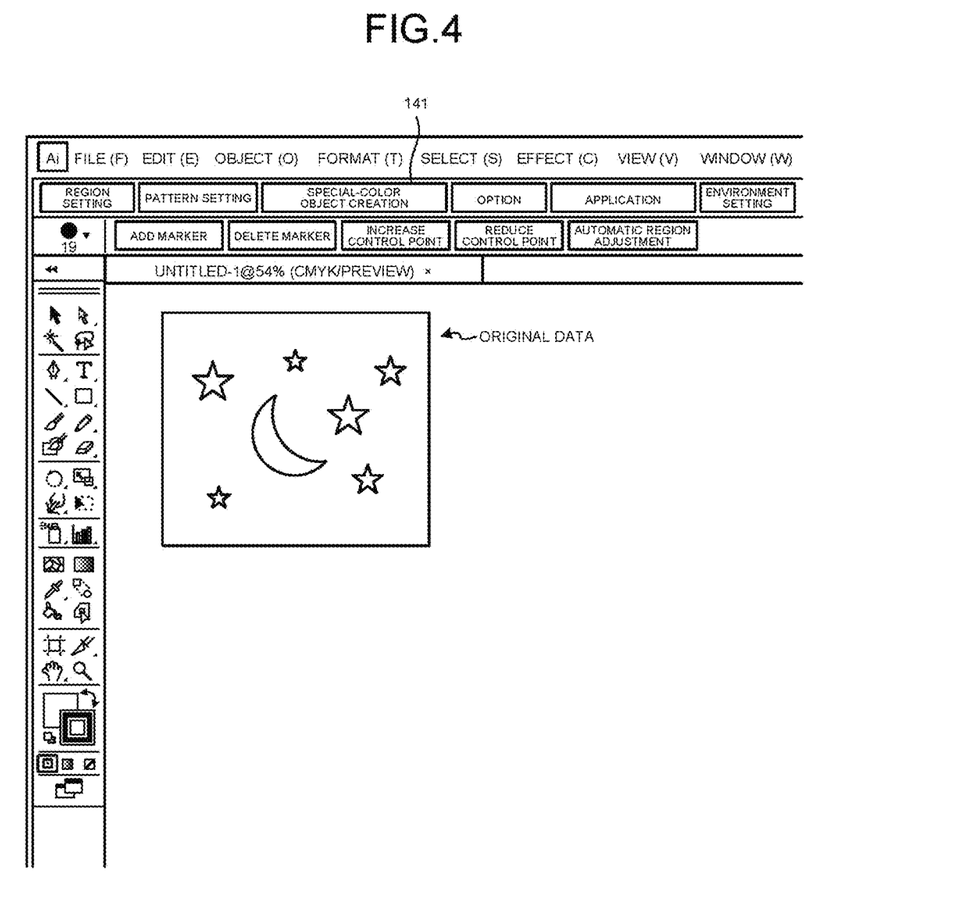
FIG. 4 illustrates one example of a user interface.

In the present embodiment, the operation controller 11 can accept various kinds of operations through a user interface (UI) displayed by the display controller 14 as illustrated in FIG. 4. In the example illustrated in FIG. 4, original data before printing (before output) is displayed (preview display) on the UI. In the example of FIG. 4, a button 141 to instruct creation of a special color object is displayed on the UI, and when depression of the button 141 is accepted, the operation controller 11 displays an operation screen (for example, it may be a sub-screen) to accept a specification of an attribute of an image object to a subject on which a special color object to be newly added is superimposed, and specification of a page to be a subject of creation of the special color object. According to an operation accepted through the operation screen, the attribute specifying unit 111 can specify an image object to be a subject, and the page specifying unit 112 can specify a page to be a subject. Not limited thereto, for example, it may be configured such that on the UI, a button to accept specification of an attribute of an image object to be a subject on which a special color object is superimposed, and a button to accept specification of a page to be a subject of creation of the special color object are displayed separately.

Explanation of FIG. 3 is continued. The setting-information specifying unit 113 specifies setting information of a special color object to be created according to an operation made by a user. In this example, information indicating a color space and information indicating a density value are at least included. The setting-information specifying unit 113 reads, when setting information of a special color object to be created is stored in the data storage unit 15 (one example of "storage unit"), the setting information from the data storage unit 15, and on the other hand, when the setting information of the color object to be created is not stored in the data storage unit 15, the setting information is specified according to an instruction from the user. A method of storing setting information in the data storage unit 15 is described later.

In this example, on the operation screen described above, buttons (hereinafter, "setting buttons") that are in one-to-one correspondence with multiple types of gloss effects, and to accept a selection of setting information to obtain a corresponding gloss effect are displayed. Not limited thereto, for example, it may be configured such that multiple setting buttons are displayed on the UI. When either one of the setting buttons is pressed, the setting-information specifying unit 113 checks whether setting information to obtain a gloss effect corresponding to the pressed setting button is stored in the data storage unit 15. When the setting information to obtain the gloss effect corresponding to the pressed setting button is stored in the data storage unit 15, the setting information is read from the data storage unit 15, and the read setting information is specified. On the other hand, when the setting information to obtain the gloss effect corresponding to the pressed setting button is not stored in the data storage unit 15, a screen (setting-information input screen) to prompt to input setting information to obtain the gloss effect corresponding to the pressed setting button is displayed, and the setting information accepted through the setting-information input screen is specified.

In this example, after the operation to specify the attribute of the image object to be a subject on which the special color object is superimposed, the page to be a subject of creation of the special color object, and the setting information of the special color object to be created, the user performs an operation to instruct to perform (start) creation of the special color object (for example, an operation of pressing a button (for example, a button on the UI) to accept an instruction to start creation of a special color object). Accepting this operation, the operation controller 11 instructs creation of the special color object based on various kinds of specifications (specification of an attribute, a page, setting information, and the like) to the special-color-object creation controller 13 described later. For example, the operation controller 11 sends event information that includes information instructing creation of the special color object, information indicating the attribute specified by the attribute specifying unit 111, information indicating the page specified by the page specifying unit 112, and the setting information specified by the setting-information specifying unit 113 to the special-color-object creation controller 13 described later.

The edit-processing specifying unit 114 specifies edit processing of a special color object according to an operation by a user. Edit processing includes, for example, processing of deleting a special color object, processing of changing a density value of a special color object, and the like. For example, a button to specify edit processing is displayed on the UI for each type of edit processing of a special color object, and the edit-processing specifying unit 114 can specify edit processing corresponding to a pressed button.

In this example, after the operation to specify the edit processing, the user performs an operation to instruct to perform the edit processing, (for example, an operation of pressing a button to accept an instruction to perform (start) the edit processing. The button to accept an instruction to perform the edit processing may be displayed on the UI described above, or may be displayed on a separate screen from the UI. It is not necessarily required to check an original data (preview) before printing when specifying the edit processing. When accepting this operation, the operation controller 11 instructs to perform the specified edit processing to the special-color-object creation controller 13. For example, the operation controller 11 sends the event information (for convenience of explanation, referred to as "edit event information" in some cases) that includes the information indicating the edit processing specified by the edit-processing specifying unit 114, the information to instruct to perform the specified edit processing (command), and the like to the special-color-object creation controller 13 described later.

The data input unit 12 reads original data (in this example, PDF data) specified according to an operation made using an input device (operation unit) such as the keyboard 100 from a memory (for example, the HDD 102 or the like), and stores the read original data in the data storage unit 15.

The special-color-object creation controller 13 controls creation of a special object (additional object), or controls edit of a special color object based on the event information received from the operation controller 11. In the example illustrated in FIG. 3, the special-color-object creation controller 13 includes a first identifying unit 131, a creating unit 132, a second identifying unit 133, and an edit processing unit 134.

The first identifying unit 131 identifies all of image objects having the attribute specified by the attribute specifying unit 111 from among image objects that are included in the original data. More specifically, the first identifying unit 131 identifies all of imager objects having the attribute specified by the attribute specifying unit 111 from among image objects that are included in the page specified by the page specifying unit 112.

Figure 5:
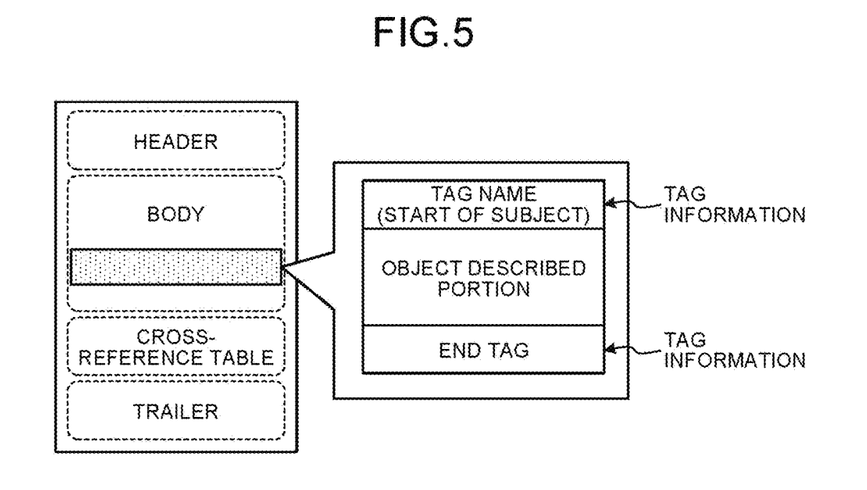
FIG. 5 illustrates one example of a file structure of original data.

The creating unit 132 creates, for each of the identified image objects, a special color object that has the same shape as the image object and is to be superimposed on the image object. In this example, the creating unit 132 adds and embeds, for each of created special color objects, tag information (one example of "identification information") to identify as an additional image object in the original data. FIG. 5 illustrates one example of a file structure of original data. As described above, original data in the present embodiment is PDF data, and is constituted of a header, a body, a cross-reference table, and a trailer. In the present embodiment, to achieve batch editing of additional objects, tag information is added to a special color objects to be an additional object. This tag information can be saved in original data, and is effective also when the original data is opened again (when re-read from the data storage unit 15). In the example illustrated in FIG. 5, the tag information includes a tag name indicating start of a subject special color object, and an end tag indicating end of the subject special color object.

Figure 6:
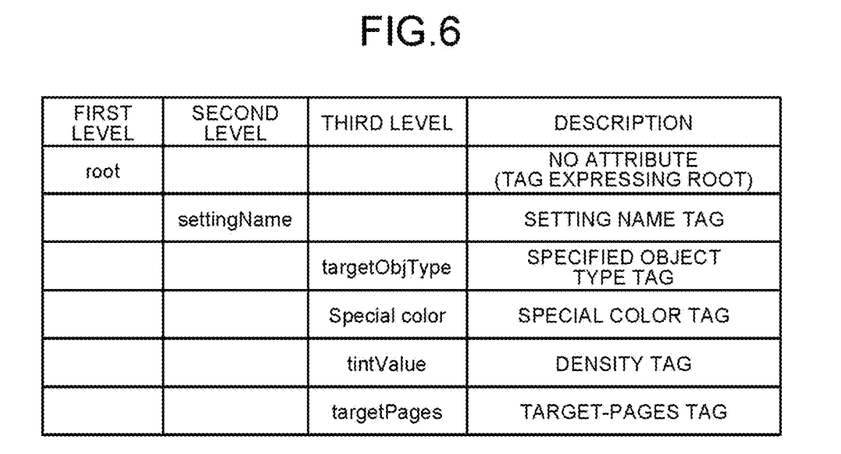
FIG. 6 illustrates one example of a data format of setting information.

Explanation is continued referring back to FIG. 3. The creating unit 132 creates a special color object for each of the special color objects that are identified by the first identifying unit 131, by using the setting information specified by the setting-information specifying unit 113. Moreover, the creating unit 132 stores the setting information (setting information common among special color objects created for each of the image objects identified by the first identifying unit 131) that is used to create the special color object in the data storage unit 15. For example, it may be configured to store a type of the gloss effect and the setting information, associating with each other, in the data storage unit 15). Thus, when the setting button described above is pressed, it becomes easy to check whether the setting information to obtain the gloss effect corresponding to the pressed setting button is present in the data storage unit 15. Note that a data format of the setting information is of any format, and for example, it may be a data format of an extensible markup language (XML) as illustrated in FIG. 6, but not limited thereto.

Furthermore, for example, when at least a part of an image object (referred to as "second image object" for convenience of explanation) having higher display priority than an image object (referred to as "first image object" for convenience of explanation) to be a subject on which a special color object to be newly added is superimposed is overlapped on the first image object, the creating unit 132 can create the special color object such that the special color object has higher display priority than that of the first image object, and lower priority than that of the second image object.

Explanation of FIG. 3 is continued. The second identifying unit 133 identifies, when receiving the edit event information from the operation controller 11, all of special color objects to which tag information (identification information) is added from among image objects included in original data. The edit processing unit 134 subjects all of the special color objects identified by the second identifying unit 133 to edit processing specified by the edit-processing specifying unit 114 (batch processing).

The display controller 14 controls to display various kinds of screens and images on a display unit (for example, the display 101) such as a liquid crystal display device, for example.

Note that the respective functions of the host device 10 may be implemented by performing a program by the CPU 106, or at least a part of the functions of the host device 10 may be implemented by a special hardware circuit. A program executed by the CPU 106 may be recorded in a computer-readable recording medium, such as a compact-disk read-only memory (CD-ROM), a compact disk recordable (CDR), a digital versatile disk (DVD) to be provided as a computer program product.

Figure 7:
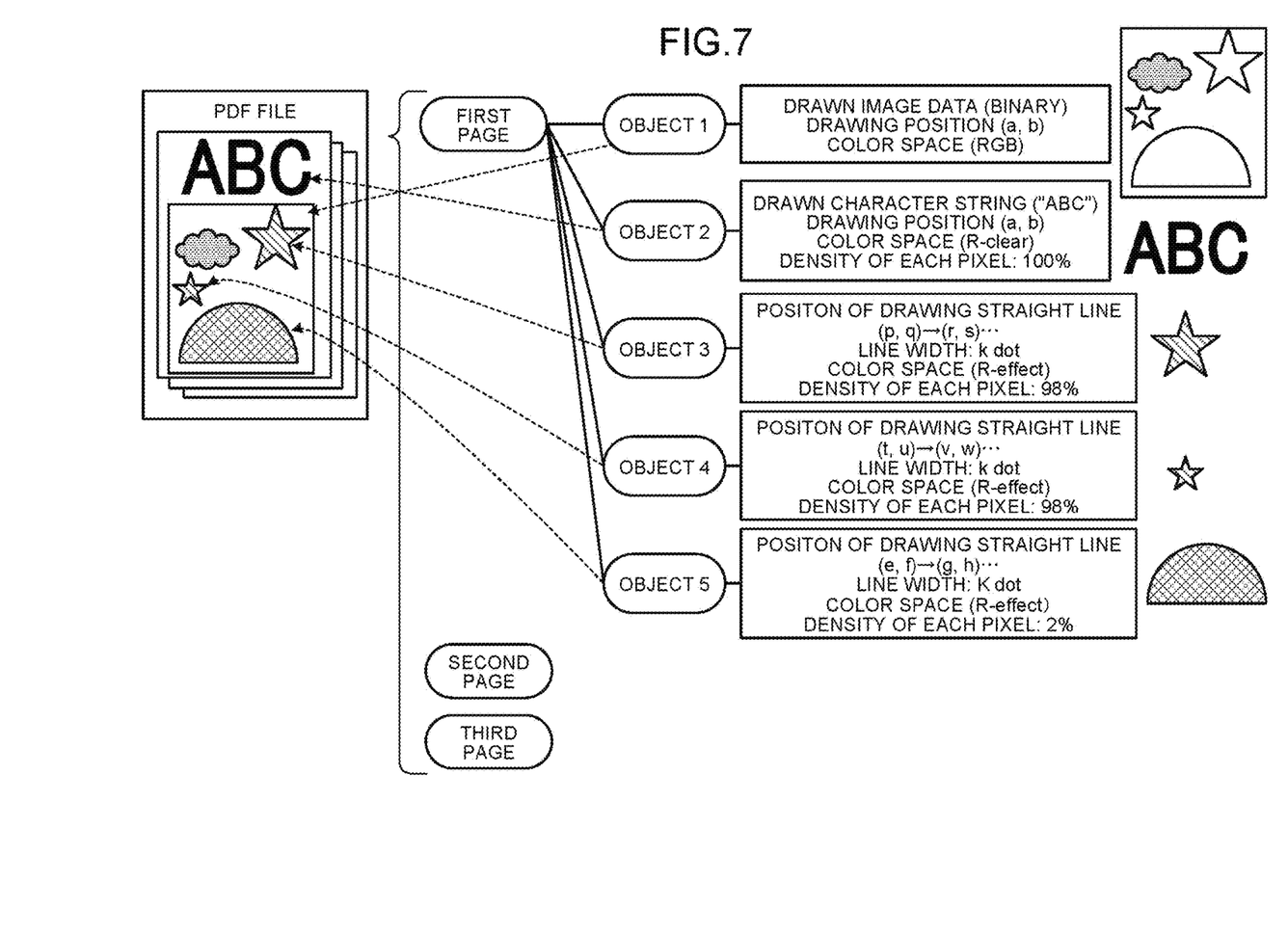
FIG. 7 illustrates one example of original data.

FIG. 7 illustrates one example of original data (original data including a special color object as an additional object) that is created by the host device 10. The original data includes drawing information per objects included in the same page. For example, the drawing information includes information indicating a position of a drawing region, a color space, and density. In the example illustrated in FIG. 7, an object 1 is an image object expressed by binary data, and includes information indicating a drawing position and a color space of RGB, as the drawing information. An object 2 is an image object that is expressed by text (a character string of clear toner in this example), and includes information indicating a drawing position, a color space of the character string of clear toner, and density of each pixel as the drawing information.

Objects 3 and 4 are special color objects, and only a portion of "star" included in the object 1 that is a scenic shot is a region for which mirror finish is specified as a type of the gloss effect. As drawing information of these, information indicating a position at which a straight line is drawn, a line width, a color space of a gloss region to which a gloss effect is given, and a density value of each pixel (density value corresponding to the mirror finish) is included. An object 5 is a special color object, and only a portion of "mountain" included in the object if which is a scenic shot, is a region for which a matte finish is specified for a type of the gloss effect. As drawing information of the object 5, information indicating a position at which a straight line is drawn, a line width, a color space of a gloss region to which a gloss effect is given, and a density value of each pixel (density value corresponding to the matte finish) is included.

In the object 2, R-Clear is defined as a color plate, and in the objects 3 to 5, R-effect is defined as a color plate. These are color plates that cannot be expressed in CMYK at printing. Generally, when toner other than CMYK (for example, red toner), is used to print, red is defined as a color plate in an electronic image file. Also for clear toner, the color space of an output of a portion using clear toner similarly uses a special definition instead of CMYK in an electronic image file.

Figure 8:
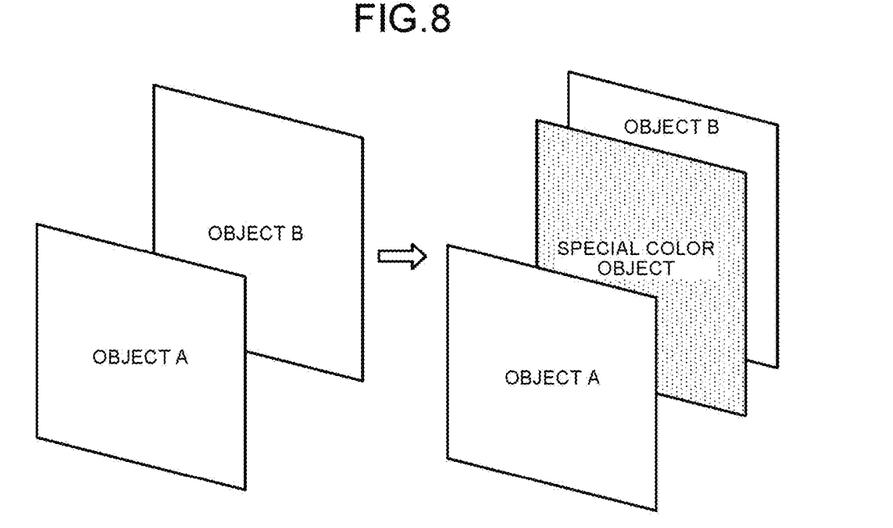
FIG. 8 is a conceptual diagram illustrating a method of creating a special color object.

FIG. 8 is a conceptual diagram illustrating a method of creating a special color object. A "object B" in FIG. 8 is an image object to be a subject on which a special color object to be newly added is superimposed (image object right on which a special color object having the same shape is placed), and it is assumed that the display priority of an object A is higher than the display priority of the object B. When a user performs an operation to instruct creation of a special color object besides specifying an attribute of the object B (more specifically, the setting information and the like are also specified), a special color object having the same shape as the object B is created to be placed right over the object B. As described above, because the display priority of this special color object is set to be higher than the display priority of the object B, the object A having higher display priority is not be hidden by the created special color object.

Figure 9:
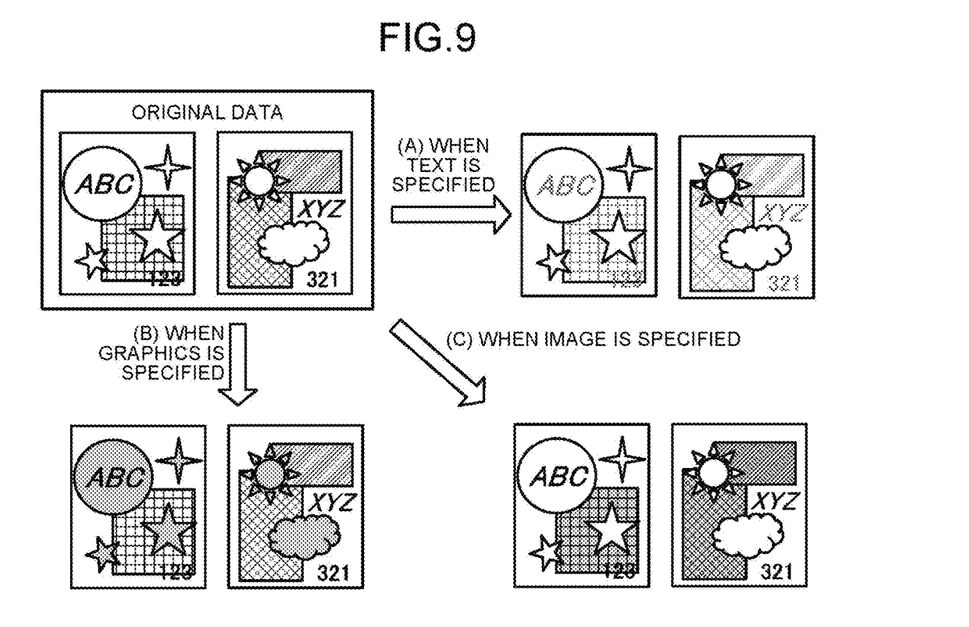
FIG. 9 is a conceptual diagram illustrating creation of a special color object based on an attribute and a page specified by an operation of a user.

FIG. 9 is a conceptual diagram illustrating creation of a special color object based on an attribute and a page specified by an operation of a user. As illustrated in FIG. 9(A), when "text" is specified by as an attributed of an image object to be subject of creation of a special object, a special color object having the attribute of "text" in the same shape thereto is created right over the image object having the attribute of "text" out of image objects included in the original data. Moreover, as illustrated in FIG. 9(B), when "graphics" is specified as an attribute of an image object to be a subject, a special color-object having the attribute of "graphics" is in the same shape thereto is created right over an image object having the attributed of "graphics" out of the image objects included in the original data. Furthermore, as illustrated in FIG. 9(C), when "image" is specified as an attributed of an image object to be a subject, a special color object having the attribute of "image" in the same shape thereto is created right over an image object having the attribute of "image" out of the image objects included in the original data.

Figure 10:
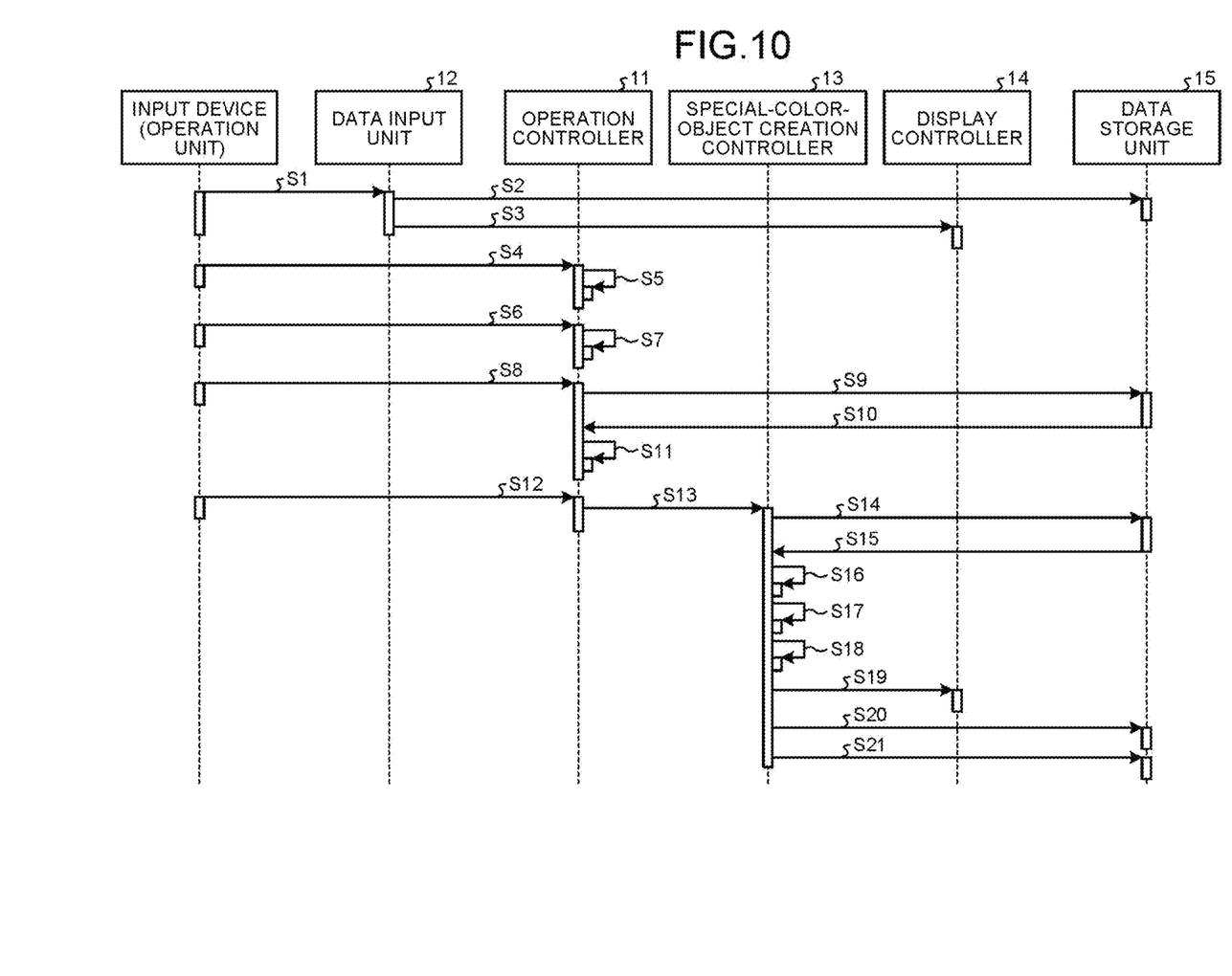
FIG. 10 is a sequence diagram illustrating one example of a procedure of creation of a special color object by the host device.

FIG. 10 is a sequence diagram illustrating one example of a procedure of creation of a special color object (additional object) by the host device 10. First, when an operation of specifying original data that is stored in a memory (the HDD 102 or the like) through the input device (operation unit) such as the keyboard 100 (step S1), the data input unit 12 reads the original data stored in the memory, and stores the read original data in the data storage unit 15 (step S2). Moreover, the data input unit 12 converts the read original data into preview display data in a data format supported by the display controller 14, and causes the display controller 14 to display the converted data (step S3).

Subsequently, when accepting an operation to specify a page to be a subject of creation of a special color object (step S6) through the UI described above, the operation controller 11 (the attribute specifying unit 111) specifies a page according to the accepted operation (step S7).

Subsequently, when accepting an operation to specify setting information through the UI described above (step S8), in this example, when accepting depression of either setting button, the operation controller 11 (the setting-information specifying unit 113) requests setting information to obtain a gloss effect corresponding to the pressed setting button (step S9), and receives a result to the request (step S10). The operation controller 11 then specifies setting information (step S11). When the setting information to obtain the gloss effect corresponding to the pressed setting button has already been stored in the data storage unit 15, the setting information can be received as the result to the request. Therefore, the operation controller 11 (the setting-information specifying unit 113) specifies the received setting information. On the other hand, when the setting information to obtain the gloss effect corresponding to the pressed setting button is not stored in the data storage unit 15, the operation controller 11 (the setting-information specifying unit 113) displays the setting-information input screen described above, and specifies setting information accepted through the setting-information input screen.

Subsequently, when accepting an operation to instruct performance (start) of creation of a special color object through the UI described above (step S12), the operation controller 11 creates event information to send to the special-color-object creation controller 13 (step S13). As described above, this event information includes information instructing creation of a special color object, information indicating the attribute specified at step S5, information indicating the page specified at step S7, the setting information specified at step S11, and the like.

The special-color-object creation controller 13 (the first identifying unit 131) that has received the event information from the operation controller 11 requests the data storage unit 15 for original data, the preview of which being displayed (step S14), and receives the original data (electronic file) as a result to the request (step S15). Subsequently, the special-color-object creation controller 13 (the first identifying unit 131) selects at least one page that has been specified at step S7 from among pages constituting the original data received at step S15 (step S16). Subsequently, the special-color-object creation controller 13 (the first identifying unit 131) identifies all of image objects having the attribute specified at step S5 from among image objects included in at least one page selected at step S16 (step S17). Subsequently, the special-color-object creation controller 13 (the creating unit 132) creates, for each of the image objects specified at step S17, a special color object that has the same shape as the image object, and that is to be placed right over the image object, by using the setting information specified at step S11 (step S18).

Subsequently, the special-color-object creation controller 13 performs a control to cause the display controller 14 to display the original data to which the special color object is newly added (step S19), and performs a control to cause the data storage unit 15 to store the original data (step S20). Furthermore, the special-color-object creation controller 13 performs a control to cause the data storage unit 15 to store the setting information that is used for creating the special color object at step S18 (step S21).

Figure 11:
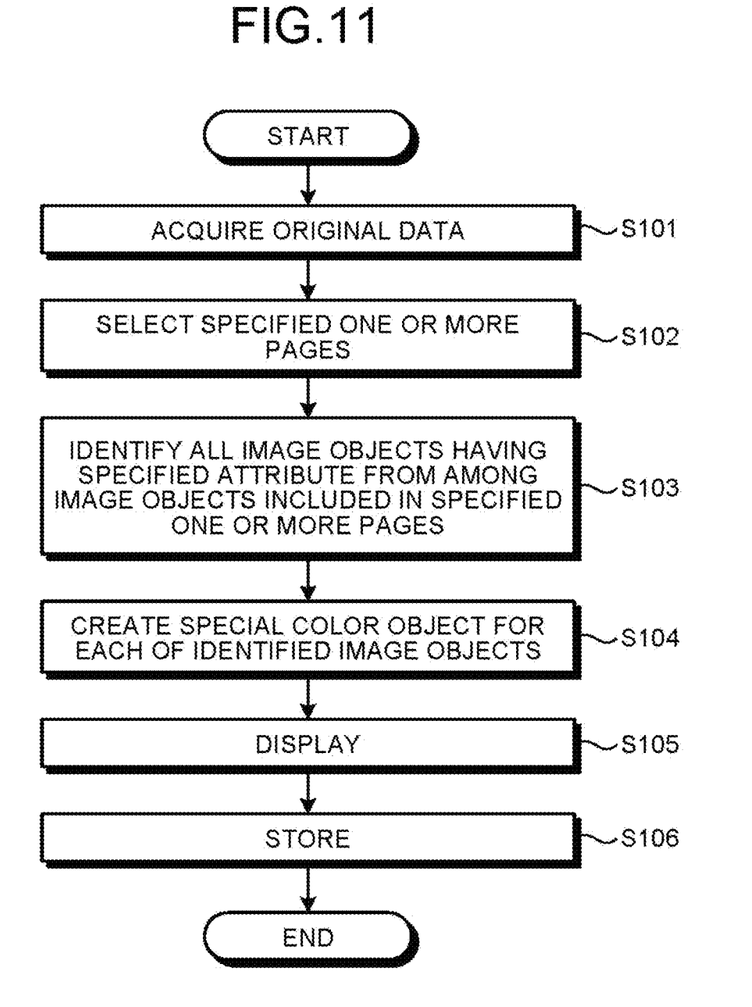
FIG. 11 is a flowchart illustrating an operation example of a special-color-object creation controller.

FIG. 11 is a flowchart illustrating an operation example of the special-color-object creation controller 13 when a special color object is to be created. As illustrated in FIG. 11, the special-color-object creation controller 13 (the first identifying unit 131) acquires original data from the data storage unit (step S101). Subsequently, the special-color-object creation controller 13 (the first identifying unit 131) selects at least one page (that is, one or more pages specified by the page specifying unit 112) specified by the event information that, is received from the operation controller 11, from among pages constituting the original data (step S102). Subsequently, the special-color-object creation controller 13 (the first identifying unit 131) identifies all of image objects having the attribute specified by the event information (that is, the attribute specified by the attribute specifying unit 111) out of the image objects included in at least one page selected at step S102 (step S103). Subsequently, the special-color-object creation controller 13 creates, for each of the image objects identified at step S103, a special color object that has the same shape as the image object, and that is to be placed right over the image object, by using the setting information specified by the event information (that is, the setting information specified by the setting-information specifying unit 113) (step S104). The color space and the density value of the special color object are set according to the setting information.

The special-color-object creation controller 13 performs a control to cause the display controller 14 to display the original data to which the special color object is newly added (step S105). Moreover, the special-color-object, creation controller 13 performs a control to cause the data storage unit 15 to store the original data to which the special color object is newly added, and performs a control to cause the data storage unit 15 to store the setting information of the special color object newly created (step S106).

Figure 12:
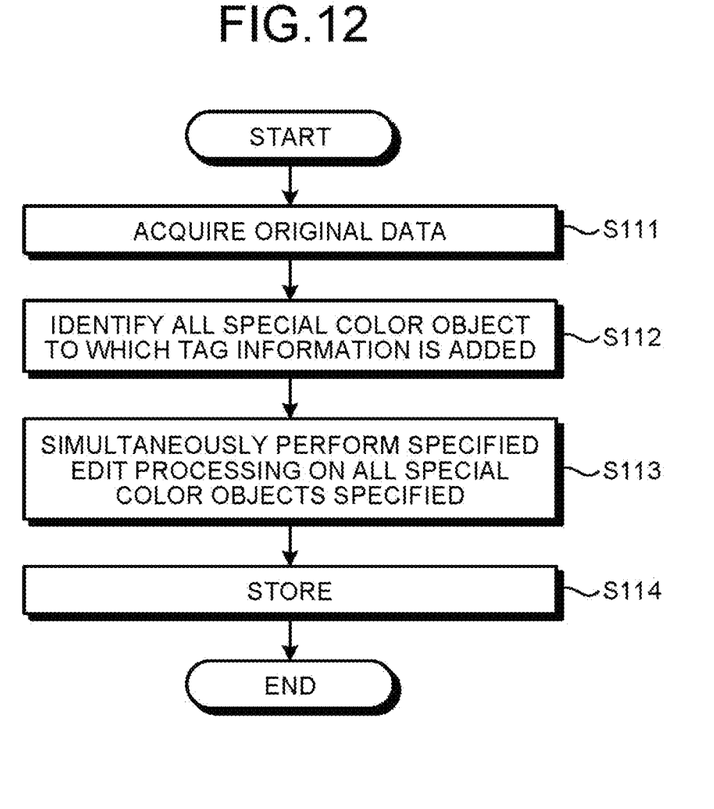
FIG. 12 is a flowchart illustrating an operation example of a special-color-object creation controller.

FIG. 12 is a flowchart illustrating an operation example of the special-color-object creation controller 13 when receiving the edit event information described above from the operation controller 11. First, the special-color-object creation controller 13 (the second identifying unit 133) acquires original data from the data storage unit 15 (step S111). Subsequently, the special-color-object creation controller 13 (the second identifying unit 133) identifies all of special color objects to which tag information is added from among image objects included in the original data (step S112). Subsequently, the special-color-object creation controller 13 (the edit processing unit 134) subjects all of the special color objects identified at step S112 to edit processing specified by the edit event information (that is, the edit processing specified by the edit-processing specifying unit 114) simultaneously (step S113). The special-color-object creation controller 13 then performs a control to cause the data storage unit 15 to store the original data subjected to the edit processing (step S114).

Figure 13:
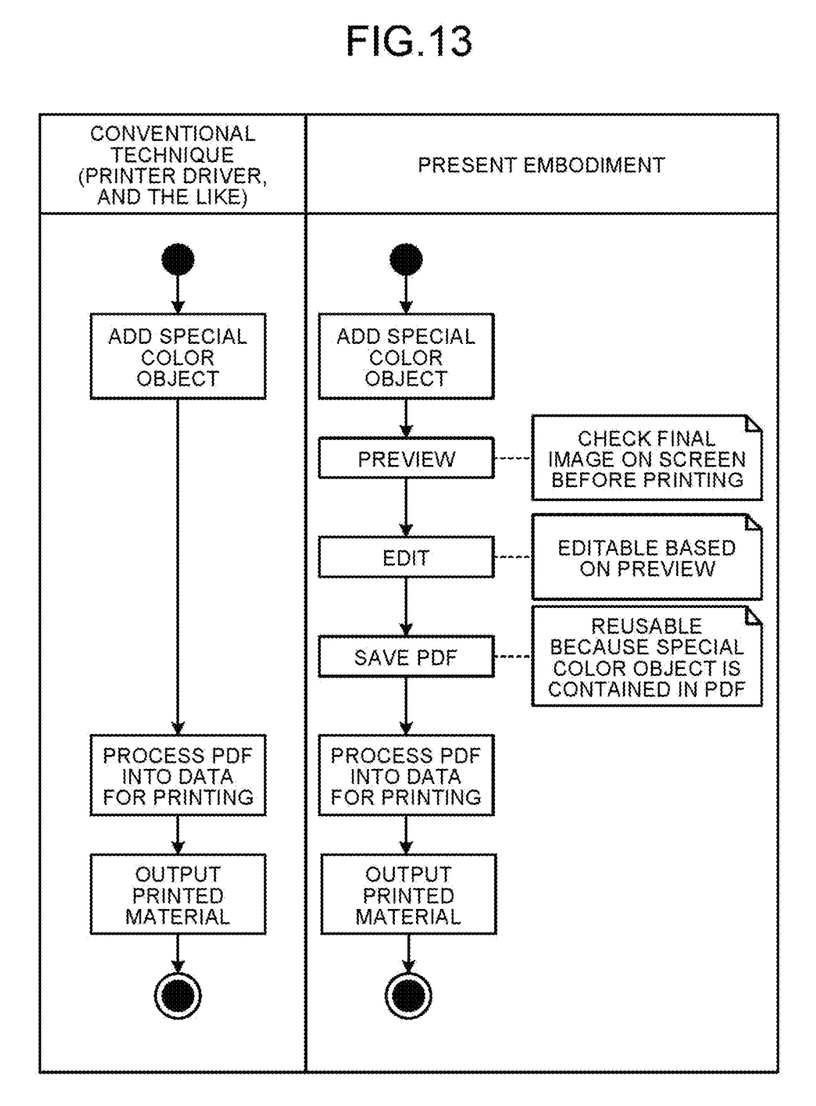
FIG. 13 is a diagram illustrating comparison between a conventional technique and a present embodiment.

FIG. 13 is a diagram illustrating comparison between a conventional technique and the present embodiment. Also in a conventional technique, it has been possible to create a special color object for multiple image objects over multiple pages by a printer driver, or the like. However, in the conventional technique, it has been impossible to check a final image (check a preview) before printing, to edit (including deletion) viewing the preview or the like, to reuse a special color object newly added, and the like. On the other hand, the present embodiment enables to check a preview, to edit viewing the preview (note that it is not necessarily required to view the preview), and to reuse a special color object newly added.

As explained above, the host device 10 of the present embodiment specifies an attribute of an image object to be a subject on which a special color object to be newly added is superimposed, according to an operation by a user. The host device 10 then identifies all of image objects having the specified attributed from among image objects included in original data, and creates, for each of the specified image objects, a special color object that has the same shape as the image object, and that is to be superimposed on the image object. According to the present embodiment, by performing an operation to specify an attribute of an image object to be a subject on which a special color object is superimposed instead of performing an operation to separately select all image objects to be a subject on which a special color object to be newly added is super imposed, a user can cause automatic creation of a special color object that has the same shape as the image object and that is to be superimposed on (placed right over) the image object. Thus, the work efficiency at the time of creating a special color object to be newly added can be improved.

Although a special color object in the above embodiment is one example of an "additional object" indicating an image object to be newly positioned on an existing image object (additional image object), the mode of the additional object is not limited to the special color object, but may be, for example, an image object to be printed with colored toner.

According to an embodiment, the work efficiency at the time of creating an additional object can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   processing circuitry configured to perform a process comprising
   (a) specifying, for each image object amongst a plurality of image objects represented in image data, an attribute of the image object, the specified attribute being one of:
      text, when the image object is expressed by a character string; or
      graphics, when the image object is expressed by vector data; or
      image, when the image object is expressed by binary data;
   (b) identifying all image objects having the specified attribute from among the plurality of image objects and
   (c) creating, for each identified image object of the identified image objects with the specified attribute, an additional object that has an identical shape to the identified image object and that is to be superimposed on the identified image object.

2. The information processing apparatus according to claim 1, wherein
   the image data is a set of a plurality of pages, and
   the process performed by the processing circuitry further comprises
   specifying at least one page that is a subject of creation of the additional object, and
   identifying all image objects having the attribute specified from among the plurality of image objects included in the specified page.

3. The information processing apparatus according to claim 2, wherein the image data is data in a portable document format.

4. The information processing apparatus according to claim 1, wherein the processing circuitry is further configured to add and embed, to the image data, identification information for identifying the additional object for each of the created additional objects.

5. The information processing apparatus according to claim 4, wherein the processing circuitry is further configured to:
   specify edit processing of the additional object;
   identify all of the additional objects to which the identification information is added from among the plurality of image objects included in the image data; and
   perform the specified edit processing on all of the additional identified objects.

6. The information processing apparatus according to claim 1, wherein the processing circuitry is further configured to store setting information that is common among the additional objects created for the respective identified image objects, in a storage unit.

7. The information processing apparatus according to claim 6, wherein the setting information includes at least information indicating a color space and information indicating a density value.

8. The information processing apparatus according to claim 6, wherein the processing circuitry is further configured to:
   specify the setting information of the additional object to be created, read the setting information from the storage unit when the setting information of the additional object to be created is stored in the storage unit, specify the setting information according to an instruction of a user when the setting information of the additional object to be created is not stored in the storage unit, and create the additional objects by using the specified setting information.

9. An information processing method performed by an information processing apparatus configured by processing circuitry to perform a method comprising:
(a) specifying, for each image object amongst a plurality of image objects represented in image data, an attribute of the image object, the specified attribute being one of:
text, when the image object is expressed by a character string; or
graphics, when the image object is expressed by vector data; or
image, when the image object is expressed by binary data;
(b) identifying all image objects having the specified attribute from among the plurality of image objects; and
(c) creating, for each identified image object of the identified image objects with the specified attribute, an additional object that has an identical shape to the identified image object and that is to be superimposed on the identified image object.

10. A non-transitory recording medium with an executable program stored thereon, an information processing apparatus executing the program to perform a method comprising the steps of:
(a) specifying, for each image object amongst a plurality of image objects represented in image data, an attribute of the image object, the specified attribute being one of:
text, when the image object is expressed by a character string; or
graphics, when the image object is expressed by vector data; or
image, when the image object is expressed by binary data;
(b) identifying all image objects having the specified attribute from among the plurality of image objects; and
(c) creating, for each identified image object of the identified image objects with the specified attribute, an additional object that has an identical shape to the identified image object and that is to be superimposed on the identified image object.

* * * * *